Nov. 11, 1969  R. F. McCASLAND  3,477,783

PORTABLE SLIDE VIEWER

Filed June 15, 1967

ROY F. McCASLAND
INVENTOR.

BY

ATTORNEY

United States Patent Office 3,477,783
Patented Nov. 11, 1969

3,477,783
PORTABLE SLIDE VIEWER
Roy F. McCasland, 229 N. Maxwell at 3rd St.,
Tulia, Tex. 79088
Filed June 15, 1967, Ser. No. 646,374
Int. Cl. G03b 21/28
U.S. Cl. 353—78
2 Claims

ABSTRACT OF THE DISCLOSURE

A picture viewer including a rectangular case, picture projector and translucent screen. The picture projector has a rearwardly directed lens which is positioned opposite an upwardly directed first mirror. A second larger mirror is provided on the inner surface of a hinged cover member. Projected images are reflected from the first and second mirrors onto the back of the screen. The screen is mounted in a hinged frame which is substantially equal to the width and length of the case. Hinged triangular side walls supports the hinged cover member when the case is in an open position. The hinged frame, sidewalls and cover member provide for quick and easy folding or expansion of the case. The folded case provides for easy carrying and storage.

---

This invention relates to picture viewers of the type employing a projector, mirrors and a translucent screen for showing pictures such as colored slides. The projector and mirrors are arranged so that the pictures are projected on the back of the screen and are viewed therethrough.

The primary object of the invention is to provide a compact foldable construction for the described purpose, yet one which has a viewing area substantially equal to the largest dimensions of the case which forms a part thereof.

Another object is to provide generally triangular side walls which not only exclude extraneous light, but provide means for locating the large mirror of the construction at its proper angle and for positioning the screen in its vertical position.

A further object is to provide, in a compact assembly comprised of a case, projector and screen, and an adjustable first mirror whereby the projected picture may be properly framed even though there may be some misalignment of other parts.

These and other objects of the invention will become apparent from the following description and the accompanying drawing, in which.

Figure 1:
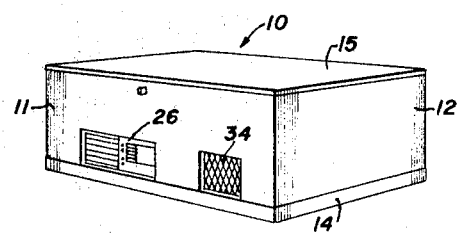
FIGURE 1 is a perspective view of a combined screen, projector and case in its closed position.
Figure 2:
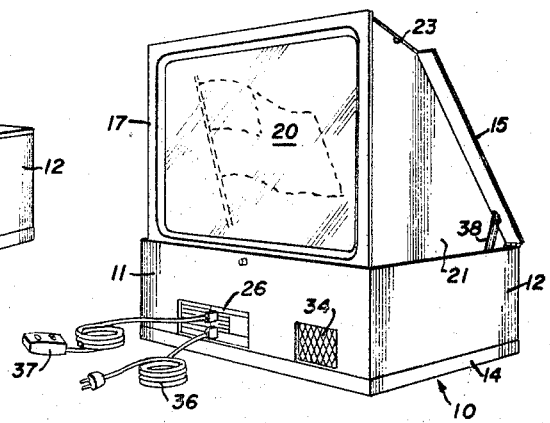
FIGURE 2 is a view of the construction illustrated in FIGURE 1, but showing the same in its extended or expanded position.
Figure 3:
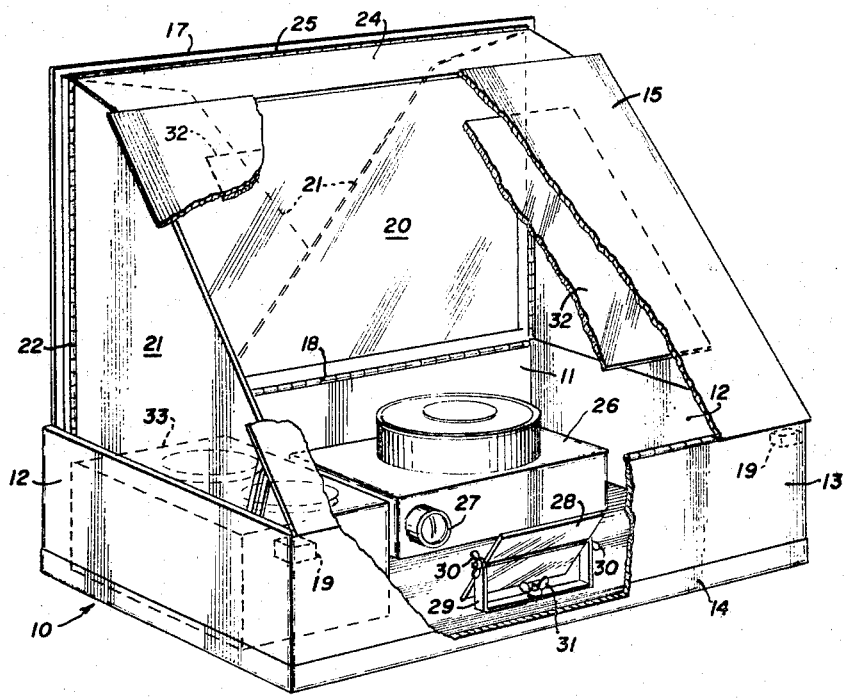
FIGURE 3 is an enlarged broken perspective rear view showing the folded position of the triangular side walls by means of dotted lines.

In the drawing, the numeral 10 generally indicates a case having a front 11, ends 12, a back 13 and a bottom 14. A rectangular cover 15 is connected with the upper edge of the back 13 by means of a piano hinge 16. Similarly, there is an open frame 17 hingedly mounted along the upper edge of the case front 11 on the inner surface thereof by means of another piano hinge 18. As best shown in FIGURE 3, the upper edge of the case front 11 is lower than the upper edges of the sides 12 to accommodate the thickness of the frame 17. Blocks 19 or other stops in the corners between the back 13 and ends 12 support the free corners of the frame 17 when the latter is in its closed position. A translucent screen 20, such as ground glass or similar sheet plastic, is mounted in the opening of the frame 17.

Generally triangular side walls 21 are connected along the ends and inner surfaces of the frame 17, but spaced from the edges thereof, by other piano hinges 22. The triangular side walls 21 are shaped so that the lower inner corners rest on the blocks 19 when the screen 20 is in a vertical position. The upper ends of the side walls 21 are at downwardly and rearwardly sloping angles, as at 23, where they are contacted by a top 24 which is hinged to and along the top of the frame 17 near the edge thereof by a piano hinge 25. The remaining sides of the triangular side walls 21 are slowed at an angle for supporting the hinged rectangular cover 15 which contacts the rear or free edge of the top 24.

Referring now particularly to FIGURE 3, there is a color slide projector 26 within the case 10 and has its lens 27 directed toward a first mirror 28 mounted in a U-shaped frame 29. Means 30 are provided for adjusting the mirror 28 about a horizontal axis and other means 31 are provided for adjusting the frame 29 and mirror 28 about a vertical axis. On the inner surface of the rectangular cover 15 there is a second and large mirror 32. The angle of the second mirror 32 is determined by the rear angle of the walls 21 and is at a mean angle for projecting pictures to the screen 20.

Forming no part of the present invention, there is a tape recorder 33 in the case 10 and to the side of the projector 26, and there is a grill 34 in the front 11 of the case 10 to accommodate the speaker of the tape recorder. Other details shown in the drawings include an extension cord 35 for supplying power to the projector 26 and a remote control unit 37 for changing color slides. Also shown are hinge brackets 38 attached to the cover 15 and in sliding contact with counterparts, not shown, on the inner surfaces of the case end walls 12.

From the foregoing it will be apparent that the described assembly may be compactly and readily folded with the projector 26 and tape recorder 33 in place, that the triangular side walls not only exclude extraneous light but locate the second mirror 32 to a proper mean angle, and that the projected picture on the screen 20 may be viewed in a semi-illuminated room.

The invention is not limited to the exemplary construction herein shown and described, but may be made in various ways.

What is claimed is:

1. In combination with a rectangular case having a front, back, ends and bottom, a picture projector in said case and having a rearwardly directed lens, a frame and translucent screen therein, said frame being substantially equal to the width and length of said case, hinge means connecting the length of said frame along the top portion of said case front, generally triangular side walls hinged along the end edges of said frame, stop means in said case adjacent the sides and back thereof and substantially near the top edges of the latter, a cover hinged along one edge to the upper portion of said back, said cover being of a size to cover said case when in its closed position, an upwardly and forwardly directed first mirror opposite the lens of said projector, a second larger mirror on the inner surface of said cover, said triangular side walls being of a size and shape whereby the free extending corners thereof will rest on said stop means when said frame is in its closed position, said triangular side walls also being shaped to support said cover and mirror thereon at a mean angle relative to the plane of said screen and the first said mirror when the case is in its open position, the upper apexes of said triangular side walls being downwardly and rearwardly sloped a distance to coincide with the upper edge of said cover when the case is in its open position.

2. In combination with a case as defined in claim 1, and means adjusting said first mirror about vertical and horizontal axes, the last said means being comprised of a U-shaped bracket pivotally supporting said first mirror on a horizontal axis and an adjustable pivot in the bottom of said bracket.

References Cited

UNITED STATES PATENTS

| | | |
|---|---|---|
| 1,283,590 | 11/1918 | Stavenhagen. |
| 1,988,522 | 1/1935 | Stanley. |
| 2,150,992 | 3/1939 | Scott. |
| 2,265,992 | 12/1941 | Beck. |
| 2,424,339 | 7/1947 | Stechbart et al. |
| 2,666,358 | 1/1954 | Eash. |
| 2,685,817 | 8/1954 | Freeman. |

NORTON ANSHER, Primary Examiner

ROBERT P. GREINER, Assistant Examiner

U.S. Cl. X.R.

353—99